United States Patent

[11] 3,629,626

| [72] | Inventor | Frank R. Abbott<br>3953 Wildwood, San Diego, Calif. 92107 |
|---|---|---|
| [21] | Appl. No. | 859,628 |
| [22] | Filed | Sept. 22, 1969 |
| [45] | Patented | Dec. 21, 1971 |

[54] LOW-INERTIA, HIGH-TORQUE MOTORS
3 Claims, 8 Drawing Figs.

[52] U.S. Cl. .................................................. 310/49,
310/68 D, 310/105, 310/266, 318/696
[51] Int. Cl. .................................................. H02k 37/00
[50] Field of Search .......................................... 310/49,
266, 162, 168, 68.4, 204, 207, 179, 181, 182, 184,
105, 170; 318/696

[56] References Cited
UNITED STATES PATENTS

| 2,411,122 | 11/1946 | Winther | 310/266 UX |
| 2,610,312 | 9/1952 | Seay | 310/184 |
| 2,837,670 | 6/1958 | Thomas | 310/49 |
| 3,165,684 | 1/1965 | Ensink | 310/49 |
| 3,392,293 | 7/1968 | De Boo | 310/49 |
| 3,421,071 | 1/1969 | Cassel | 310/68 |
| 3,437,854 | 4/1969 | Olso | 310/49 |
| 3,484,635 | 12/1969 | MacKallor | 310/266 |
| 3,522,501 | 8/1970 | Nyman | 310/49 |

*Primary Examiner*—D. F. Duggan
*Assistant Examiner*—R. Skudy
*Attorneys*—J. C. Warfield, Jr., G. J. Rubens, J. W. McLaren and T. L. Styner ABSTRACT: A motor which comprises a rotor having a thin-walled nonmagnetic cylinder in which is embedded parallel bars. The bars are thin, being limited by the thickness of the cylinder wall, and are wide enough, approximately, to span one stator pole face. Preferably two stator structures are employed, one inside and the other outside the rotor cylinder. One set of windings for raw AC, and another set of windings for pulsed or rectified AC of either polarity, are so distributed in the slots between the pole pieces as to generate a magnetic torque in either direction. The direction the armature steps is controlled by selecting the loop of positive or negative polarity obtained by rectifiers from the AC power source.

PATENTED DEC 21 1971 3,629,626

INVENTOR.
FRANK R. ABBOTT
BY
ATTORNEYS

INVENTOR.
FRANK R. ABBOTT
BY
ATTORNEYS

LOW-INERTIA, HIGH-TORQUE MOTORS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Rotors are usually too heavy to be moved in steps at the frequency of commercial power. Stepping motors, on the other hand, often comprise complex mechanisms, such as pawl and ratchet devices or brake mechanisms, and are limited in top speed in both forward and backward directions.

The object of this invention is to provide an improved motor which can run in either direction at any speed from single, one at a time, steps to full synchronous speed.

SUMMARY OF THE INVENTION

The motor of this invention comprises a rotor having a thin-walled nonmagnetic cylinder in which are embedded parallel bars. The bars are thin, being limited by the thickness of the cylinder wall, and are wide enough, approximately, to span one stator pole face. Preferably two stator structures are employed, one inside and the other outside the rotor cylinder. One set of windings for raw AC, and another set of windings for pulsed or rectified AC of either polarity, are so distributed in the slots between the pole pieces as to generate a magnetic torque in either direction. The direction the armature steps is controlled by selecting the loop of positive or negative polarity obtained by rectifiers from the AC power source, so as to aid or buck selectively, the field produced by the alternating current. Because of the novel structure of the rotor, the mass is so low that the rotor can follow single half-wave pulses from the source.

Other objects and features of this invention will become apparent to those skilled in the art by referring to specific embodiments described in the following specification and shown in the accompanying drawing in which.

Figure 1:
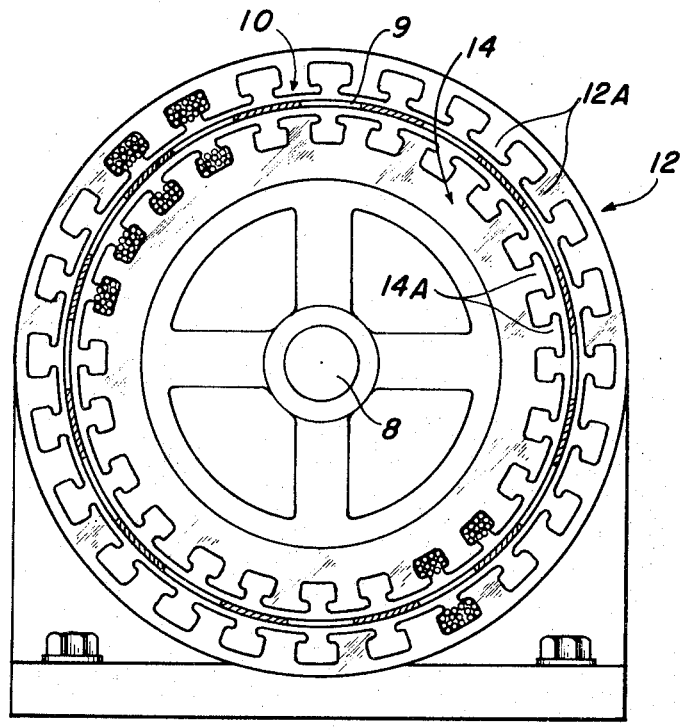
FIG. 1 is an end view, partly in section, of one motor constructed according to this invention.
Figure 2:
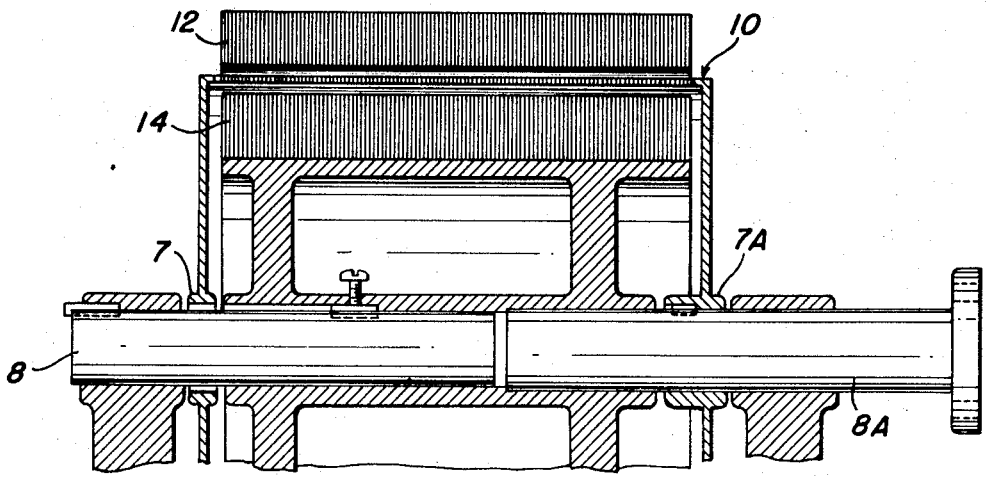
FIG. 2 is a sectional elevational view of the motor of FIG. 1.

The motor armature 10 shown in FIGS. 1 and 2, is a thin-walled cylinder, preferably supported at both ends on bearings 7 and 7A on the motor shaft 8 and 8A. The stator structure comprises inner and outer assemblies 12 and 14 both of which are stationary. One is mounted on the frame and the other is supported on the motor shaft.

The particular bearing and pillow block arrangement shown in FIG. 2 is but one specific means for supporting the stator elements inside the rotating armature cylinder. Shaft portion 8 is keyed both to the outside block and to the stator hub. Shaft portion 8A is freely journaled in the inside stator and in the outside block but is keyed to the rotor 10. Useful power is thus delivered to the right end 8A of the shaft where coupling may be attached.

The thin wall of the armature cylinder is made of strong, lightweight material such as fiber glass. Embedded in the fiber glass are bars of magnetic material such as iron, preferably laminated. The lamanai may comprise stampings of high silicon steel made with the planes of the stampings perpendicular to the axes of rotation, to reduce the magnetic reluctance in paths between pole faces of the two stator assemblies, and yet minimize eddy current losses. The width of the iron bars circumferentially of the cylinder, are about equal to the pole pitch or to the distance between like points on adjacent pole faces of the stator. The stator members 12 and 14 are for the same reason preferably laminated with sheet iron stampings. Conveniently, the shape of the pole pieces 12a and 14a are outlined by the stamping dyes, and as usual the windings are laid in the slots between the pole pieces.

Figure 3:
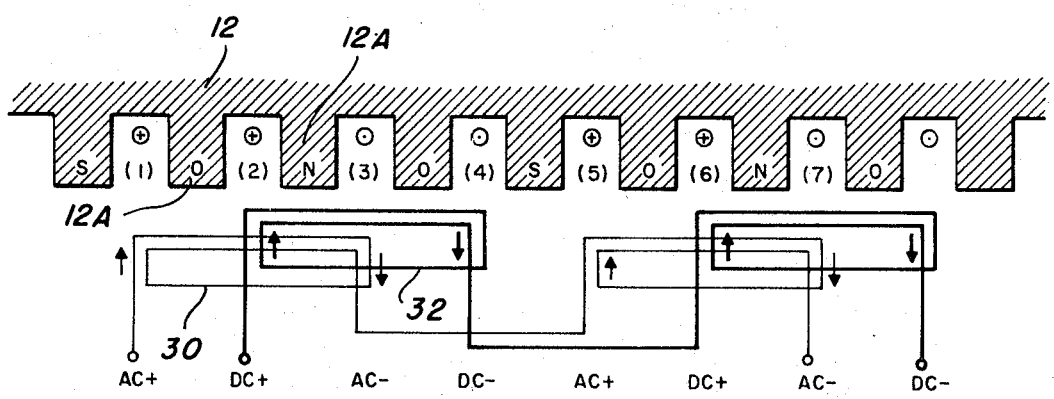
FIG. 3 is a diagram showing schematically the pole pieces and windings in slots therebetween for one specific winding layout.

While the particular windings illustrated in FIG. 3 are spiral or lap wound for two phases, wave windings could be used. In either case, the pitch is two poles per turn. That is, if one side of one coil is laid in the first slot the other side of the same coil is laid in the third slot, and the two sides of the second winding are laid in the even numbered slots. If the terminals of the windings are connected to power sources and the momentary direction of current through the windings are as indicated by the dots and crosses alternate pole pieces will be magnetized. If, now, the ampere-turns in each slot are approximately equal, the pole faces of the remaining pole pieces will have substantially zero magnetization. It is apparent now that if the momentary direction of current of one of the two windings is reversed, the condition of the magnetized and unmagnetized pole pieces are reversed.

Figure 4:
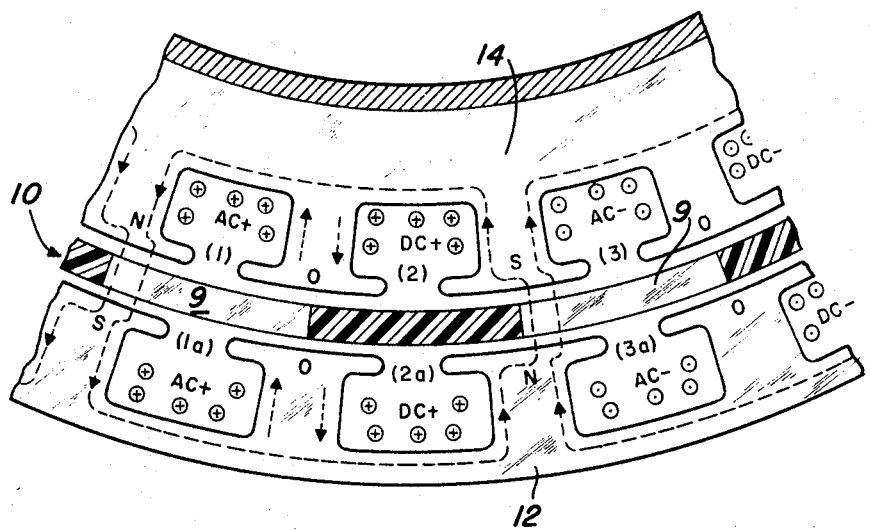
FIG. 4 is an enlarged detailed view of a section of the motor shown in FIG. 1.

Reference to FIG. 4 may facilitate rationalization of the alternate magnetized and nonmagnetized pole faces. In FIG. 4 the momentary direction of current in the windings in the slots are indicated for convenience by AC+, AC−, DC+, and DC−. In the example, illustrated the pole faces of the inner and outer stator elements are in radial registry. Also, similar windings and polarities are assumed in the slots of the inner and outer stator assemblies. By applying the familiar right-hand rule to determine the direction of the magnetic flux around the conductor, it can be seen that the direction of magnetic flux lines around slot (2) is aided by the flux lines around slot (3) but is bucked or neutralized by the flux around slot (1). Consequently, the pole face on one side of slot (2) in FIG. 4 will be magnetically neutral while the pole faces on either side of slot (2) will be magnetized, with either a North or South polarity. If, now, iron bar 9 is in a midposition covering one-half of two pole faces the distorted magnetic lines will exert a strong force drawing the bars, in FIG. 4, from right to left and exerting a torque on the connected shaft 8A. Next, if the direction of DC current in slots (2) is reversed, the magnetic pattern suggested in FIG. 4 shifts one pole to the right or to the left, and exerts a torque on the armature in the opposite direction.

Figure 5:
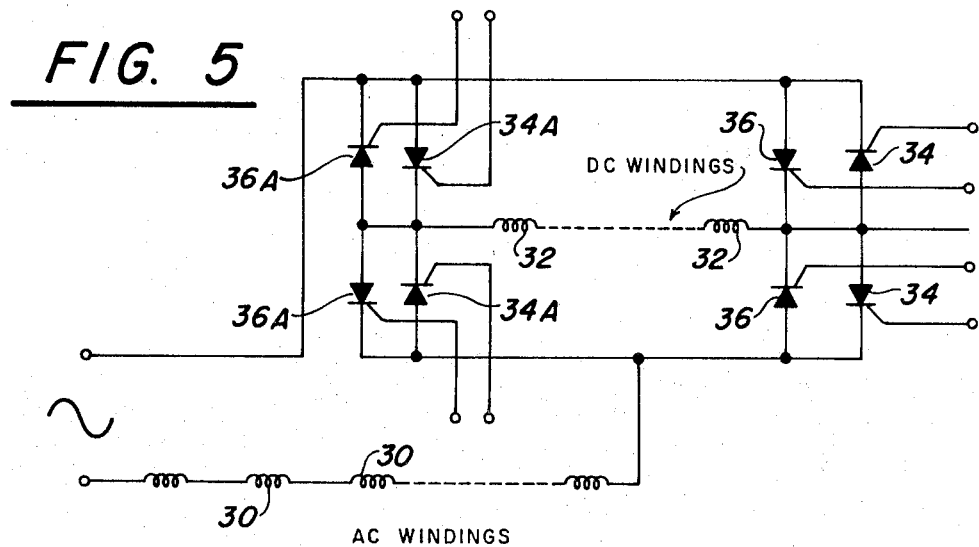
FIG. 5 is a diagram of one circuit for supplying the AC and plural DC to the motor of FIG. 1.
Figure 6:
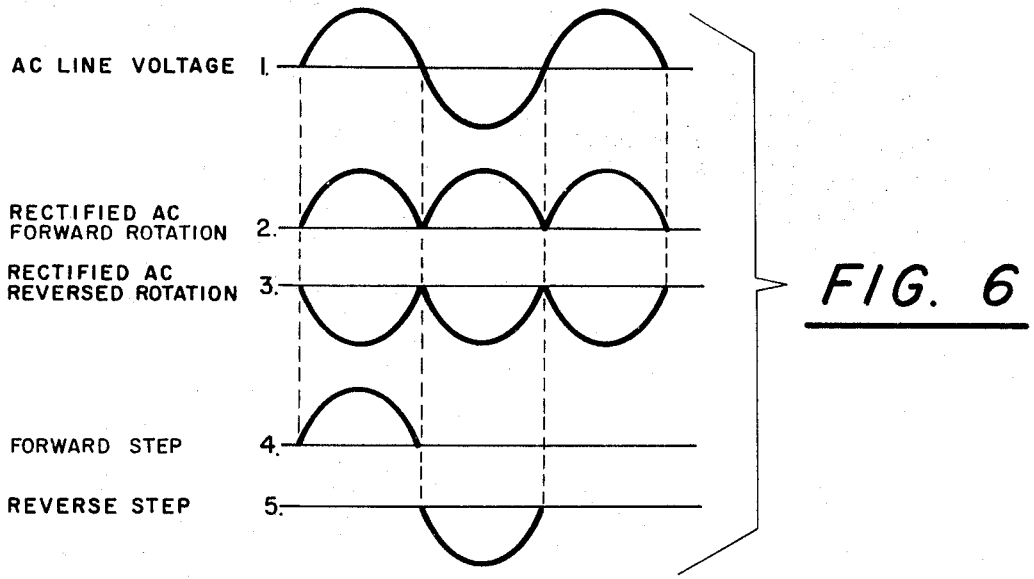
FIG. 6 is a family of curves showing the phase relations of the alternating and direct current pulses employed in the motor of FIG. 1, and obtainable by the circuitry of FIG. 5.

The wiring diagram shown in FIG. 5 shows the AC windings 30 connected in series with each other and with the alternating current power source. The direct current windings 32 are likewise connected in series and are connected across the alternating current source through the rectifiers 34, 34A, 36 and 36A. Preferably the rectifiers are of the silicon-controlled rectifier type, the control electrode terminals being brought out for connection to programming circuitry not shown, for controlling the polarity of the pulsed direct current flowing in the DC windings 32. For example, for one polarity of pulses the rectifiers 34 and 34A could be disabled by blocking bias on the control electrodes while enabling voltages are applied to the control electrodes of rectifiers 36 and 36A. For the opposite pulse polarity, the role of rectifiers 34, 34A and 36, 36A would be reversed. The top line in FIG. 6 shows the sinusoidal alternating line voltage while the second and third lines show the positive and negative halves of the rectified alternating current, for, respectively, forward rotation and reverse rotation. By programming the control circuits of the rectifiers, single sinusoidal pulses or any desired irregular series or combination of pulses of either polarity, see lines 4 and 5 of FIG. 6, may be applied to the motor for stepping of the rotor forwardly or backwardly the distance of one pole face for each DC pulse.

Figure 7:
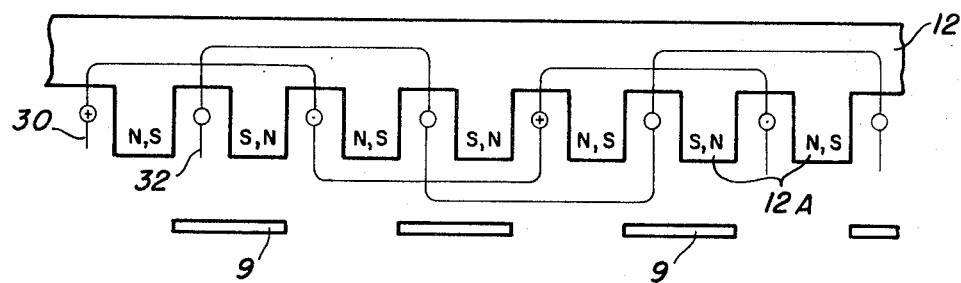
FIGS. 7 and 8 are, respectively, elevation and plan views of the pole pieces and winding layout with respect to the armature bars.
Figure 8:
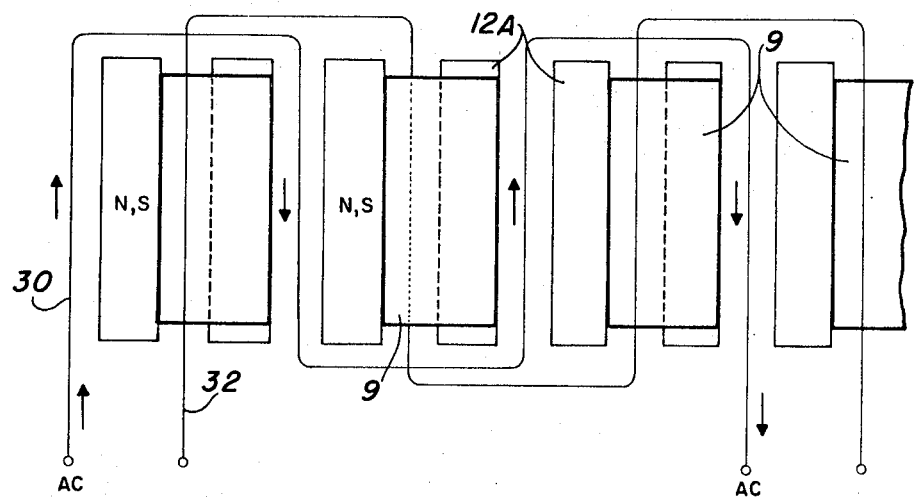

FIGS. 7 and 8 are juxtaposed to show the position of the armature with respect to the pole faces after a step has been made and no further direct current information is forthcoming. Only alternating current is flowing. Each armature bar effectively covers one pole face, the adjacent pole face remaining uncovered. As the AC alternates, the magnetic polarizations of the pole faces reverse at the AC frequency, but none of the faces demagnetize and the armature bars are each effectively clamped to its overlapping pole face.

What is claimed is:

1. A low inertia high torque stepping motor comprising:

an armature and a coaxial stator structure;

said armature consisting of a thin-walled cylinder of nonmagnetic material with a plurality of uniformly spaced parallel thin, flat, elongated magnetic bars embedded in the wall of said cylinder;

said stator structure comprising two cylindrical arrays of pole pieces disposed interiorly and exteriorly, respectively, of said armature cylinder with the pole faces of the two arrays fixed closely adjacent the inner and outer surfaces of said embedded bars for minimum air gaps;

windings in the slots between the pole pieces;

a source of alternating current coupled to some of said windings;

a source of direct current coupled to the remainder of said windings, said direct current source comprising rectifiers coupled between said alternating current source and the remainder of said windings for changing the alternating current to unidirectional pulses of current in the remainder of said windings; and control circuit means connected to said direct current source for selectively controlling said pulse to rotationally step said armature discrete distances;

the windings in which the direct current is flowing being disposed in said slots for superimposing on the alternating field pulses of magnetizing force for selectively aiding and bucking, respectively, the alternating field at different pole pieces.

2. In the stepping motor defined in claim 1:

the alternating current windings being disposed in said slots for cyclically reversing the polarity of the magnetizing forces applied to selected spaced pole pieces of said stator structure.

3. In the stepping motor defined in claim 1;

the width of said magnetic bars being approximately equal to the combined width of one pole face and one slot.

* * * * *